United States Patent [19]

Yamamoto et al.

[11] Patent Number: 5,145,916
[45] Date of Patent: Sep. 8, 1992

[54] TERMINAL-MODIFIED IMIDE OLIGOMER COMPOSITION

[75] Inventors: Shinji Yamamoto; Hideho Tanaka; Kazuyoshi Fujii, all of Oosaka, Japan

[73] Assignee: Ube Industries, Ltd., Yamaguchi, Japan

[21] Appl. No.: 513,905

[22] Filed: Apr. 24, 1990

[30] Foreign Application Priority Data

Apr. 26, 1989 [JP] Japan .................................. 1-104735

[51] Int. Cl.$^5$ ............................................. C08L 79/08
[52] U.S. Cl. ..................................... 525/421; 525/432; 525/436
[58] Field of Search .......................... 525/432, 436, 421

[56] References Cited

U.S. PATENT DOCUMENTS 4,996,101  2/1991  Landis et al. ...................... 428/272
5,011,905  4/1991  Lubowitz et al. .................. 528/170

*Primary Examiner*—Ana L. Carrillo
*Attorney, Agent, or Firm*—McAulay Fisher Nissen Goldberg & Kiel

[57] ABSTRACT

A composition of terminal-modified imide oligomers is disclosed. The composition comprises a flexible terminal-modified imide oligomer (A) and a rigid terminal-modified imide oligomer (B). The flexible terminal-modified imide oligomer (A) is selected from specific oligomers (I) and (II). The rigid terminal-modified imide oligomer (B) is selected from specific oligomers (III) and (IV). The oligomer (I) is formed from biphenyltetracarboxylic acid or its derivative, an aromatic diamine compound (a) and an unsaturated monoamine compound or an unsaturated carboxylic acid or its derivative. The oligomer (II) is formed from biphenyltetracarboxylic acid or its derivative and an unsaturated monoamine compound. The oligomer (III) is formed from biphenyltetracarboxylic acid or its derivative, an aromatic diamine compound (b) and an unsaturated monoamine compound or an unsaturated carboxylic acid or its derivative. The oligomer (IV) is formed from pyromellitic acid or its derivative, an aromatic diamine compound (c) and an unsaturated monoamine compound or an unsaturated carboxylic acid or its derivative. The aromatic diamine compound (a) has two or more aromatic rings which are combined with each other directly or by a divalent group consisting of one, two or three atoms. The aromatic diamine compound (b) has only one aromatic ring or condensed ring. The aromatic diamine compound (c) may have two or more aromatic rings as is defined in the compound (a), or may have only one aromatic ring or condensed ring as is defined in the compound (b).

9 Claims, No Drawings

TERMINAL-MODIFIED IMIDE OLIGOMER COMPOSITION

FIELD OF THE INVENTION

The present invention relates to a composition of terminal-modified imide oligomers. In more detail, the invention relates to a composition which comprises a flexible terminal-modified imide oligomer and a rigid terminal-modified imide oligomer. The flexible terminal-modified imide oligomer is formed, for example, by using biphenyltetracarboxylic acid or its derivative and an aromatic diamine compound having two or more specific aromatic rings which are combined with each other. The rigid terminal-modified imide oligomer is formed, for example, by using an aromatic diamine compound having only one aromatic ring or condensed ring, or by using pyromellitic acid or its derivative.

The terminal-modified imide oligomer composition of the present invention is heat-cured in a short time. The obtained heat-cured product is excellent in heat-resistance, mechanical strength and elasticity. Therefore, the composition of the invention can be used as a heat-resistant adhesive for various materials, a matrix resin for composites containing various reinforcements or fillers, or a molding resin. Particularly, the composition is advantageously used in the aircraft or space industry.

BACKGROUND OF THE INVENTION

A thermosetting resin which mainly contains a terminal-modified imide oligomer having a low molecular weight is highly heat-resistant. Accordingly, the thermosetting resin has been proposed and gradually used as a molding material or a matrix resin for a complex fibrous material.

For example, some addition polyimide resins having a terminal unsaturated group (imide oligomers) are proposed as a prepreg resin in Japanese Patent Provisional Publications No. 59(1984)-167569, No. 60(1985)-250030, No. 60(1985)-260624, No. 60(1985)-260625 and No. 61(1986)-247733. The imide oligomers can be prepared, for example, by a reaction of an aromatic tetracarboxylic dianhydride such as pyromellitic dianhydride or benzophenonetetracarboxylic dianhydride, an aromatic diamine and an unsaturated reactive compound.

However, the above-mentioned conventional imide oligomer resins have some problems in preparation of themselves or the products using them. For example, some diamine compounds used in preparation of the oligomers are extremely specific and expensive. The imide oligomers are low in solubility in an organic solvent, so that it is difficult for the oligomers to permeate reinforcing fibers. Further, a high boiling organic solvent which is very specific should be used in preparation of a solution of the imide oligomers. Furthermore, the imide oligomer resins have such a high melting point that the products using them tend to deteriorate at elevated temperatures.

The known imide oligomers also have some problems in the curing property. In more detail, the time required for gelation of the oligomers is relatively long, and a terminal group having a cross linking function tends to remain reactive. Therefore, if a composite is made from the known oligomers, the mechanical strength and elasticity of the heat-cured product of the oligomers are insufficient. Further, the matrix made of the known imide oligomers does not have a sufficient affinity with reinforcing fibers, so that a debonding is sometimes caused.

To solve the above-mentioned problems, improved terminal-modified imide oligomers have been proposed in Japanese Patent Applications No. 62(1987)-29766, No. 63(1988)-73194 and No. 63(1988) 21373.

Though the newly proposed terminal-modified imide oligomers solve the above-mentioned problems, a further improvement with respect to heat-resistance, mechanical strength and elasticity of the heat-cured product made from the oligomers is needed to practically use the imide oligomers.

As is mentioned above, a satisfactory imide oligomer resin, which is improved in various natures such as processability, heat-resistance and mechanical property, has not yet been proposed in this technical field. Therefore, such a satisfactory imide oligomer resin has been desired.

SUMMARY OF THE INVENTION

An object of the invention is to provide a new imide oligomer resin composition to solve the above-mentioned various problems of the conventional imide oligomer resin. Another object of the invention is to provide an improved imide oligomer resin which has the desired curing property and forms a cured product improved in heat-resistance and mechanical property.

There is provided by the present invention a composition of terminal-modified imide oligomers which comprises a flexible terminal-modified imide oligomer and a rigid terminal-modified imide oligomer, wherein the flexible terminal-modified imide oligomer is selected from terminal-modified imide oligomers (I) and (II), said oligomer (I) being formed from biphenyltetracarboxylic acid or its derivative, an aromatic diamine compound having two or more aromatic rings which are combined with each other directly or by a divalent group consisting of one, two or three atoms and an unsaturated monoamine compound or an unsaturated carboxylic acid or its derivative, and said oligomer (II) being formed from biphenyltetracarboxylic acid or its derivative and an unsaturated monoamine compound, and wherein the rigid terminal-modified imide oligomer is selected from terminal-modified imide oligomers (III) and (IV), said oligomer (III) being formed from biphenyltetracarboxylic acid or its derivative, an aromatic diamine compound having only one aromatic ring or condensed ring and an unsaturated monoamine compound or an unsaturated carboxylic acid or its derivative, and said oligomer (IV) being formed from pyromellitic acid or its derivative, an aromatic diamine compound and an unsaturated monoamine compound or an unsaturated carboxylic acid or its derivative.

The terminal-modified imide oligomer composition of the present invention is characterized in that the composition contains a flexible terminal-modified imide oligomer (A) and a rigid terminal-modified imide oligomer (B) as the main components. The flexible terminal-modified imide oligomer (A) has a flexible main chain, and a rigid terminal-modified imide oligomer (B) has a rigid main chain.

DETAILED DESCRIPTION OF THE INVENTION

The terminal-modified oligomer (I) is formed from biphenyltetracarboxylic acid or its derivative, an aromatic diamine compound (a) and an unsaturated monoamine compound or an unsaturated carboxylic acid or its derivative. The aromatic diamine compound (a) has two or more aromatic rings (preferably benzene rings) which are combined with each other directly or by a divalent group consisting of one, two or three atoms. The aromatic diamine compound (a) preferably has no condensed ring. The oligomer (I) has a relatively low molecular weight. The oligomer (I) is prepared by a polymerization reaction of the above-mentioned compounds in an organic solvent.

The terminal-modified imide oligomer (I) preferably has the formula (Ia) or (Ib):

prepared by a reaction of the above-mentioned compounds in an organic solvent.

The terminal-modified imide oligomer (II) preferably has the formula (II):

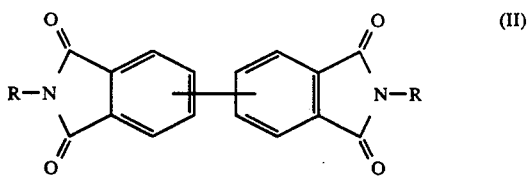

wherein R is a monovalent unsaturated terminal group derived from the unsaturated monoamine compound (in other words, formed by removing one amino group from the unsaturated monoamine compound).

The terminal-modified oligomer (III) is formed from

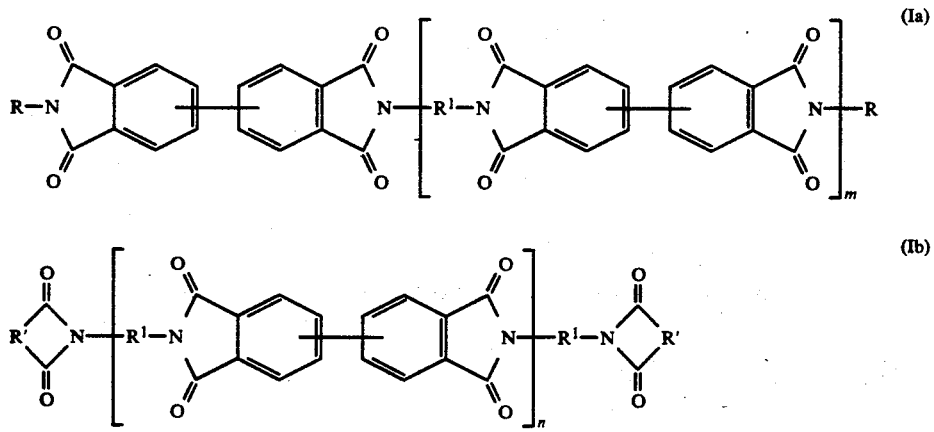

wherein R is a monovalent unsaturated terminal group derived from the unsaturated monoamine compound (in other words, formed by removing one amino group from the monoamine compound); R' is a divalent unsaturated terminal group derived from the unsaturated dicarboxylic acid or its derivative (in other words, formed by removing two carboxyl groups from the unsaturated dicarboxylic acid or its derivative); $R^1$ is a divalent aromatic residue derived from the aromatic diamine compound (a) (in other words, formed by removing two amino groups from the aromatic diamine compound (a)); and each of m and n is an integer of 1 to 80 (preferably 1 to 50, and more preferably 1 to 20). The terminal-modified oligomer (II) is formed from biphenyltetracarboxylic acid or its derivative and an unsaturated monoamine compound. The oligomer (II) is biphenyltetracarboxylic acid or its derivative, an aromatic diamine compound (b) and an unsaturated monoamine compound or an unsaturated carboxylic acid or its derivative. The aromatic diamine compound (b) has only one aromatic ring (preferably benzene ring) or condensed ring. The aromatic ring can be an aromatic heterocyclic ring such as pyridine ring in the present specification. Further, the condensed ring can be either a hydrocarbon condensed ring or a heterocyclic condensed ring. The oligomer (III) has a relatively low molecular weight. The oligomer (III) is prepared by a reaction of the above-mentioned compounds in an organic solvent.

The terminal-modified imide oligomer (III) preferably has the formula (IIIa) or (IIIb):

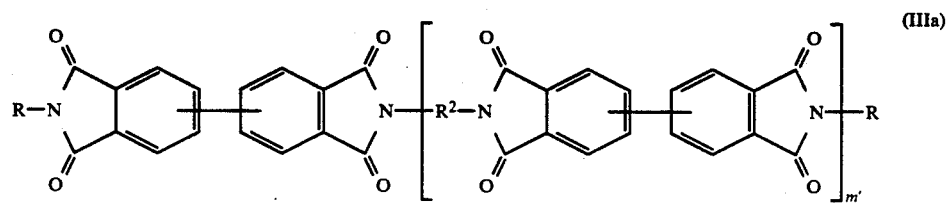

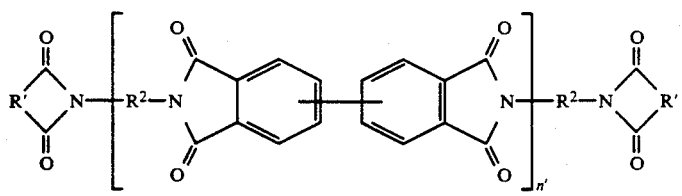

(IIIb)

wherein each of R and R' has the same meanings as each of R and R' in the formulas (Ia) and (Ib); $R^2$ is a divalent aromatic residue derived from the aromatic diamine compound (b) (in other words, formed by removing two amino groups from the aromatic diamine compound (b)); and each of m' and n' is an integer of 1 to 80 (preferably 1 to 50, and more preferably 1 to 20).

The terminal-modified oligomer (IV) is formed from pyromellitic acid or its derivative, an aromatic diamine compound (c) and an unsaturated monoamine compound or an unsaturated carboxylic acid or its derivative. There is no specific limitation with respect to the aromatic diamine compound (c). Therefore, the aromatic diamine compound (c) may have two or more aromatic rings as is defined in the compound (a), or may have only one aromatic ring or condensed ring as is defined in the compound (b). The oligomer (IV) has a relatively low molecular weight. The oligomer (IV) is prepared by a reaction of the above-mentioned compounds in an organic solvent.

The terminal-modified imide oligomer (IV) preferably has the formula (IVa) or (IVb):

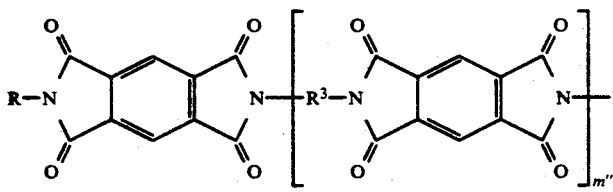

(IVa)

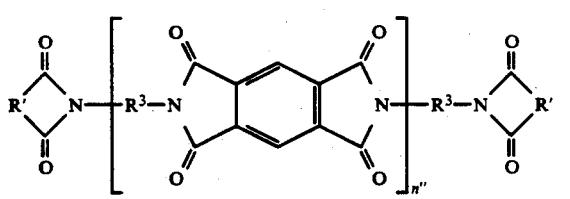

(IVb)

wherein each of R and R' has the same meanings as each of R and R' in the formulas (Ia) and Ib); $R^3$ is a divalent aromatic residue derived from the aromatic diamine compound (c) (in other words, formed by removing two amino groups from the aromatic diamine compound (c)); and each of m" and n" is an integer of 1 to 80 (preferably 1 to 50, and more preferably 1 to 20).

Examples of the biphenyltetracarboxylic acid or its derivative used in preparation of the imide oligomers (I), (II) and (III) include 3,3',4,4'-biphenyltetracarboxylic acid, dianhydride thereof, 2,3,3',4'-biphenyltetracarboxylic acid, dianhydride thereof and a mixture of two or more of them. Particularly, 2,3,3',4'-biphenyltetracarboxylic dianhydride is preferred.

As the pyromellitic acid or its derivative used in preparation of the imide oligomer (IV), pyromellitic dianhydride is particularly preferred.

The aromatic diamine compound (a) used in preparation of the imide oligomer (I) has two or more aromatic rings (preferably benzene rings). The aromatic rings such as benzene rings are combined with each other directly or by a divalent group consisting of one, two or three atoms. Examples of the divalent group include —O—, —S—, —SO—, —CO—, —$SO_2$— and —$CH_2$—. The divalent groups may have one or more substituent groups. For example, the divalent group represented by —$CH_2$— can be substituted with a lower alkyl group (having one, two or three carbon atoms) such as methyl or ethyl. It is preferred that the two amino groups of the diamine compound (a) are attached to the two aromatic rings (more preferably two benzene rings) respectively. The aromatic diamine compound (a) preferably has no condensed ring.

Examples of the aromatic diamine compound (a) include benzidine diamine compounds such as 3,3'-dimethoxybenzidine and 3,3'-diethylbenzidine; diphenyl ether diamine compounds such as 4,4'-diaminodiphenyl ether, 3,3'-diaminodiphenyl ether and 3,4'- diaminodiphenyl ether; diphenylmethane diamine compound such as 4,4'-diaminodiphenylmethane, 3,3'-diaminodiphenylmethane and 3,4'-diaminodiphenylmethane; diphenyl sulfone diamine compounds such as 4,4'-diaminodiphenyl sulfone and 3,3'-diaminodiphenyl sulfone; bis(aminophenoxy)benzene diamine compounds such as 1,3-bis(4-aminophenoxy)benzene and 1,3-bis(3-aminophenoxy)benzene; bis-[(aminophenoxy)phenyl]propane diamine compounds such as 2,2-bis[4-(4-aminophenoxy)phenyl]propane, 2,2-bis[4-(3-aminophenoxy)phenyl]propane and 2,2-bis[4-(4-aminophenoxy)-phenyl]hexafluoropropane; bis[(aminophenoxy)phenyl]sulfones such as bis[4-(3-aminophenoxy)phenyl]sulfones and bis[4-(4-aminophenoxy)phenyl]-sulfones; and a mixture of these aromatic diamine compounds.

The aromatic diamine compound (b) used in preparation of the imide oligomer (III) has only one aromatic ring or condensed ring. The aromatic ring can be an aromatic heterocyclic ring such as pyridine ring. Further, the condensed ring can be either a hydrocarbon condensed ring or a heterocyclic condensed ring.

Examples of the aromatic diamine compound (b) include diamine compounds having one benzene ring such as phenylene diamine or its derivative (e.g., p-phenylene diamine, m-phenylene diamine and o-phenylene diamine); aromatic diamine compounds having one heterocyclic group such as pyridine diamine compounds (e.g., 2,4-diaminopyridine and 2,6-diaminopyridine); diphenylene sulfone diamine compounds (e.g., 3,7-diamino-diphenylene sulfone and 2,8-dimethyl-3,7-diamino-diphenylene sulfone, also known as "orthotolidine sulfone"); and aromatic diamine compounds having a condensed ring (e.g., 9,9-bis(4-aminophenyl)-10-hydroanthracene, 2,5-bis(m-aminophenyl)-1,3,4-oxadiazole, 2,2'-diaminobisthiazole, 2,2'- bis(m-aminophenyl)-benzothiazole and 2,2'- bis(m-aminophenyl)-benzoxazole). As the aromatic diamine compound (b), diphenylene sulfone diamine compounds are particularly preferred.

There is no specific limitation with respect to the aromatic diamine compound (c) used in preparation of the imide oligomer (III). The aromatic diamine compound (c) may have two or more aromatic rings as is defined in the compound (a), or may have only one aromatic ring or condensed ring as is defined in the compound (b). Examples of the aromatic diamine compound (c) are the same as the examples of the compounds (a) and (b).

The unsaturated monoamine compound used in preparation of the imide oligomers (I), (II), (III) and (IV) has both of an unsaturated group (cross linking group) and a monoamino group (primary amino group). The unsaturated group can be either carbon-carbon double bond (ethylenic group) or carbon-carbon triple bond (acetylenic group). The unsaturated monoamine compound is reactive to form an imide bond by a reaction with a pair of adjacent carboxyl groups.

Examples of the monoamine compound include (i) aliphatic monoamine compounds such as propargyl amine (PA), 3-aminobutyne, 4-aminobutyne, 5-aminobutyne, 4-aminopentyne, 6-aminohexyne, 7-aminoheptyne, 4-amino-3-methylbutyne and allylamine (AA); and (ii) aromatic monoamine compounds such as m-aminostyrene, p-aminostyrene, m-amino-α-methylstyrene, 1-isopropenyl-3-(2-aminoisopropyl)benzene, 1-isopropenyl-4-(2-aminoisopropyl)benzene, 3-aminophenylacetylene and 4-aminophenylacetylene. In the present invention, these unsaturated monoamine compounds can be used singly or in combination of two or more compounds.

The unsaturated carboxylic acid or its derivative used in preparation of the imide oligomers (I), (III) and (IV) preferably contains both of an unsaturated group (cross linking group) such as carbon-carbon double bond (ethylenic group) or carbon-carbon triple bond (acetylenic group) and a pair of carboxyl groups which are attached to adjacent carbon atoms (dicarboxyl group) or monoanhydride thereof inside of the molecule. The acid or its derivative also preferably is reactive to form an imide bond by a reaction with a compound having an amino group.

Examples of the carboxylic acid or its derivative include (i) maleic anhydride and a derivative thereof (e.g., dimethylmaleic anhydride, diisopropylmaleic anhydride and dichloromaleic anhydride); (ii) tetrahydrophthalic anhydride and a derivative thereof (e.g., methyltetrahydrophthalic anhydride); and (iii) nadic anhydride (NA) and a derivative thereof (e.g., methylnadic anhydride, oxynadic anhydride, methyloxynadic anhydride, dimethyloxynadic anhydride, ethylnadic anhydride and hexachloronadic anhydride). In the present invention, these carboxylic acids or their derivatives can be used singly or in combination of two or more compounds.

Each of the terminal-modified imide oligomers (I), (II), (III) and (IV) can be prepared, for example, by (i) reacting the above-mentioned compounds (i.e., the aromatic tetracarboxylic acid ingredient, the aromatic diamine ingredient and the unsaturated monoamine compound or dicarboxylic acid or its derivative) to form an oligomer having an amide-acid bond (i.e., an amic acid oligomer); and (ii) converting the amic acid oligomer into an imide oligomer which has as a terminal group an unsaturated group having a function of undergoing addition polymerization. In the reaction (i), the total amount of the acid anhydrides (or pairs of adjacent carboxyl groups) in the ingredients preferably is almost equimolar with the total amount of the amino groups in the ingredients. The reaction (i) is preferably carried out in an organic polar solvent at a temperature of not higher than about 100° C. (more preferably not higher than 80° C.). The converting reaction (ii) comprises dehydration and cyclization reactions of the amic acid oligomer obtained by the reaction (i). The reaction (ii) can be carried out, for example, by adding an imidization agent to the amic acid oligomer at a relatively low temperature of about 0° to 140° C. or by heating the amic acid oligomer at a relatively high temperature of 140° to 250° C.

Examples of the organic polar solvent used in the reaction (i) include an amide solvent such as N,N-dimethylformamide, N,N-diethylformamide, N,N-dimethylacetamide, N,N-diethylacetamide, N-methyl-2-pyrrolidone and N-methyl-carolactam; a sulfur compound solvent such as dimethyl sulfoxide, hexamethyl phosphoramide, dimethyl sulfone, tetramethylene sulfone and dimethyltetramethylene sulfone; a phenol solvent such as cresol and phenol; and the other organic solvents such as pyridine, ethylene glycol and tetramethylurea.

Each of the terminal-modified imide oligomers (I), (II), (III) and (IV) preferably has a logarithmic viscosity (measured at concentration of 0.5 g/100 ml using N-methyl-2-pyrrolidone as solvent at temperature of 30° C.) in the range of 0.01 to 1 and a melting point in the range of 100° to 300° C. (more preferably in the range of 150° to 270° C.). Each of the terminal-modified imide oligomers also preferably is soluble in an organic polar solvent and is in the form of (powdery) solid at room temperature (25° C.).

In the terminal-modified imide oligomer composition of the present invention, the rigid terminal-modified imide oligomer (B) is preferably contained in an amount of 2 to 70 weight % (more preferably 10 to 50 weight %) based on the total amount of the flexible and rigid terminal-modified imide oligomers (A) and (B).

If the amount of the rigid terminal-modified imide oligomer (B) is extremely small in the composition of the invention, the heat-resistance, mechanical strength and elasticity of the heat-cured product are lowered. On the other hand, if the amount of the rigid terminal-modified imide oligomer (B) is extremely large, the composition should be heated at high temperatures to obtain a heat-cured product, and the heat-cured product tends to be fragile. Therefore, the rigid terminal-modified imide oligomer (B) is preferably used in the above-mentioned amount.

The composition of the invention obtained by mixing the above-mentioned terminal-modified imide oligomers. The mixing process can be carried out, for example, by mixing solutions of the imide oligomers, or by heating the imide oligomers at a temperature of higher than the melting point of each of the oligomers to mix them at the molten state. It is particularly preferred to mix the solutions of the imide oligomers.

The composition of the present invention can be used as a raw material for preparation of molded product or lamination, or as an adhesive. Further, the composition can be used as a matrix material for preparation of a composite.

The composition of the invention is also available in the form of a solution in an organic polar solvent. For example, a heat-cured product can be obtained by heating a reinforcement impregnated or coated with the solution. The reinforcement is heated after or while removing the solvent of the solution. The reinforcement is preferably heated at 200° to 400° C. (more preferably 220° to 350° C.) for about 0.5 to 30 hours (more preferably 1 to 25 hours).

The molded and heat-cured product has a glass transition temperature (Tg) of not lower than 270° C., and is highly heat-resistant.

EXAMPLES

The present invention is described in more detail by the following examples.

The measurements of the properties of the materials in the examples are described below.

(i) The logarithmic viscosity ($\eta$inh) of each of the terminal-modified imide oligomers was measured in the following manner.

A sample was homogeneously dissolved in N-methyl-2-pyrrolidone (NMP) to prepare a solution containing each of the terminal-modified imide oligomers in concentration of 0.5 weight %. The solution viscosity of the solution and the viscosity of the solvent only were measured at 30° C. The obtained values were introduced into the following equation to calculate the logarithmic viscosity.

$$\text{Logarithmic Viscosity } (\eta \text{ inh}) = \frac{\ln\left(\frac{\text{Viscosity of Solution}}{\text{Viscosity of Solvent}}\right)}{\text{Concentration of Solution}}$$

(ii) The glass transition temperature (Tg) was measured according to glass blade method using mechanical spectrometer (produced by Rheometrics Co., RMS605). The glass blade (diameter: 2 mm, length: 32 mm) impregnated with each of the terminal-modified imide oligomer compositions was cured at 250° C. for 2 hours. The dynamic viscoelasticity of the obtained heat-cured product was measured under torsional vibration (maximum strain: 0.2 %, frequency: 1 Hz). Thus a curve on the graph of the shear modulus to the temperature was obtained. The glass transition temperature (Tg) was obtained from the peak temperature of the tangent of dynamic mechanical loss (tan $\delta$).

(iii) The remaining ratio of shear modulus at high temperatures (%) was obtained from the curve on the graph of the shear modulus to the temperature used in the measurement of the glass transition temperature (Tg). In more detail, the remaining ratio was the ratio ($G'_{260}/G'_{40}$) of the storage modulus at 260° C. ($G'_{260}$) to the storage modulus at 40° C. ($G'_{40}$).

EXAMPLE 1 i)

Preparation of terminal-modified imide oligomer (A-Ia)

Into a 1 1-volume flask were charged (a) 105.92 g of 2,3,3'4'- biphenyltetracarboxylic dianhydride (a-BPDA), (b) 87.70 g of 1,3-bis(4-aminophenoxy)benzene (TPE-R), (c) 6.67 g of propargyl amine (PA) and (d) 326 g of N-methyl-2-pyrrolidone (NMP). They were stirred at 50° C. for 1 hour in nitrogen gas stream to produce an amic acid oligomer. The resulting reaction solution was heated to 185° C. and stirred for 1 hour at the same temperature to produce a terminal-modified imide oligomer (A-Ia). The polymerization degree (m) of the oligomer was 5.

The reaction solution was cooled to room temperature (about 25° C.), and then poured into water to deposit powdery imide oligomer. The powder of the imide oligomer was collected by filtration, and washed twice with methanol at 25° C. The powder was dried under reduced pressure to obtain powder of the terminal-modified imide oligomer (A-Ia).

The logarithmic viscosity of the terminal-modified imide oligomer (A-Ia) is set forth in Table 1.

ii)

Preparation of terminal-modified imide oligomer (B-IIIa)

Into a 1 1-volume flask were charged (a) 105.92 g of 2,3,3'4'- biphenyltetracarboxylic dianhydride (a-BPDA), (b) 82.26 g of orthotolidine sulfone (o-TS), (c) 6.67 g of propargyl amine (PA) and (d) 779 g of N-methyl-2-pyrrolidone (NMP). They were stirred at 50° C. for 1 hour in nitrogen gas stream to produce an amic acid oligomer. The resulting reaction solution was heated to 185° C. and stirred for 1 hour at the same temperature to produce a terminal-modified imide oligomer (B-IIIa). The polymerization degree (m') of the oligomer was 5.

The reaction solution was purified in the same manner as in the preparation of the terminal-modified imide oligomer (A-Ia) to obtain powder of the terminal-modified imide oligomer (B-IIIa).

The logarithmic viscosity of the terminal-modified imide oligomer (B-IIIa) is set forth in Table 1.

Preparation of terminal-modified imide oligomer composition

In solvent of N,N-dimethylacetamide, 80 weight parts of the terminal-modified imide oligomer (A-Ia) and 20 weight parts of the terminal-modified imide oligomer (B-IIIa) were mixed to produce 10 weight % imide oligomer solution.

A glass blade was impregnated with the obtained solution, and dried at 150° C. in an oven under reduced pressure for 8 hours to evaporate and remove the solvent.

The dynamic viscoelasticity of the terminal-modified imide oligomer composition in the glass blade was measured. The glass transition temperature (Tg) and the remaining ratio of shear modulus at high temperatures (%) were thus obtained. The results are set forth in Table 2.

EXAMPLE 2 iii)

Preparation of terminal-modified imide oligomer (A-II)

Into a 1 l volume flask were charged (a) 105.92 g of 2,3,3''- biphenyltetracarboxylic dianhydride (a-BPDA), (b) 39.66 g of propargyl amine (PA) and (c) 582 g of N-methyl-2-pyrrolidone (NMP). They were stirred at 50° C. for 1 hour in nitrogen gas stream to produce an amic acid compound. The resulting reaction solution was heated to 185° C. and stirred for 1 hour at the same temperature to produce a terminal-modified imide oligomer (A-II) comprising a unsaturated imide compound. The polymerization degree of the oligomer was 0.

The reaction solution was purified in the same manner as in the preparation of the terminal-modified imide oligomer (A-Ia) in Example 1 to obtain powder of the terminal-modified imide oligomer (A-II).

The logarithmic viscosity of the terminal-modified imide oligomer (A-II) is set forth in Table 1.

Preparation of terminal-modified imide oligomer composition

A glass blade impregnated with a terminal-modified imide oligomer composition was prepared in the same manner as in Example 1, except that 66 weight parts of the terminal-modified imide oligomer (A-Ia) prepared in Example 1, 17 weight parts of the terminal-modified imide oligomer (A-II) and 17 weight parts of the terminal-modified imide oligomer (B-IIIa) prepared in Example 1 were used.

With respect to the terminal-modified imide oligomer composition in the glass blade, tests of physical properties were carried out in the same manner as in Example 1. The results are set forth in Table 2.

EXAMPLE 3 iv)

Preparation of terminal-modified imide oligomer (B-IV)

A terminal-modified imide oligomer (B-IV) was prepared in the same manner as in the preparation of the terminal-modified imide oligomer (A-Ia) in Example 1, except that 58.20 g of Pyromellitic dianhydride (PMDA) was used in place of a-BPDA. The polymerization degree (m'') of the oligomer was 5.

The logarithmic viscosity of the terminal-modified imide oligomer (B-IV) is set forth in Table 1.

Preparation of terminal-modified imide oligomer composition

A glass blade impregnated with a terminal-modified imide oligomer composition was prepared in the same manner as in Example 1, except that the terminal-modified imide oligomer (B-IV) was used in place of the terminal modified imide oligomer (B-IIIa).

With respect to the terminal-modified imide oligomer composition in the glass blade, tests of physical properties were carried out in the same manner as in Example 1. The results are set forth in Table 2.

EXAMPLE 4 v)

Preparation of terminal-modified imide oligomer (A-Ib)

Into a 1 l-volume flask were charged (a) 147.11 g of 2,3,3'4'- biphenyltetracarboxylic dianhydride (a-BPDA), (b) 175.40 g of 1,3-bis(4-aminophenoxy)benzene (TPE-R), (c) 32.64 g of nadic anhydride and (d) 605 g of N-methyl-2-pyrrolidone (NMP). The other processes were repeated in the same manner as in in the preparation of the terminal-modified imide oligomer (A-Ia) in Example 1 to produce a terminal-modified imide oligomer (A-Ib). The polymerization degree (n) of the oligomer was 5.

The reaction solution was purified in the same manner as in the preparation of the terminal-modified imide oligomer (A-Ia) in Example 1 to obtain powder of the terminal-modified imide oligomer (A-Ib).

The logarithmic viscosity of the terminal-modified imide oligomer (A-Ib) is set forth in Table 1.

vi)

Preparation of terminal-modified imide oligomer (B-IIIb)

Into a 2 l-volume flask were charged (a) 147.11 g of 2,3,3'4'- biphenyltetracarboxylic dianhydride (a-BPDA), (b) 164.52 g of orthotolidine sulfone (o-TS), (c) 32.64 g of nadic anhydride and (d) 1,377 g of N-methyl-2-pyrrolidone (NMP). The other processes were repeated in the same manner as in in the preparation of the terminal-modified imide oligomer (A-Ia) in Example 1 to produce a terminal-modified imide oligomer (B-IIIb). The polymerization degree (n') of the oligomer was 5.

The reaction solution was purified in the same manner as in the preparation of the terminal-modified imide oligomer (A-Ia) in Example 1 to obtain powder of the terminal-modified imide oligomer (B-IIIb).

The logarithmic viscosity of the terminal-modified imide oligomer (B-IIIb) is set forth in Table 1.

Preparation of terminal-modified imide oligomer composition

A glass blade impregnated with a terminal-modified imide oligomer composition was prepared in the same manner as in Example 1, except that 80 weight parts of the terminal-modified imide oligomer (A-Ib) and 20 weight parts of the terminal-modified imide oligomer (B-IIIb) were used.

With respect to the terminal-modified imide oligomer composition in the glass blade, tests of physical properties were carried out in the same manner as in Example 1. The results are set forth in Table 2.

Comparison Examples 1–3

Glass blades impregnated with terminal-modified imide oligomers were prepared in the same manner as in Example 1, except that in place of the terminal-modified imide oligomer composition, the terminal-modified imide oligomer (A-Ia) was merely used (Comparison Example 1), the terminal-modified imide oligomer (B-IIIa) was merely used (Comparison Example 2), and a mixture of the terminal-modified imide oligomers (A-Ia) and (A-II) was used (Comparison Example 3).

With respect to each of the terminal-modified imide oligomers in the glass blade, tests of physical properties were carried out in the same manner as in Example 1. The results are set forth in Table 2.

TABLE 1

| Terminal-modified Imide Oligomer | Kind of Reaction Components | | | Logarithmic Viscosity ($\eta$ inh) |
|---|---|---|---|---|
| | Aromatic Tetracarboxylic Acid | Aromatic Diamine Compound | Unsaturated Compound | |
| A-Ia | a-BPDA | TPE-R | PA | 0.134 |
| A-II | a-BPDA | — | PA | 0.02 |
| A-Ib | a-BPDA | TPE-R | NA | 0.148 |
| B-IIIa | a-BPDA | o-TS | PA | 0.180 |
| B-IVa | PMDA | TPE-R | PA | 0.101 |

TABLE 1-continued

| Terminal-modified Imide Oligomer | Kind of Reaction Components | | | Logarithmic Viscosity ($\eta$ inh) |
|---|---|---|---|---|
| | Aromatic Tetracarboxylic Acid | Aromatic Diamine Compound | Unsaturated Compound | |
| B-IIIb | a-BPDA | o-TS | NA | 0.199 |

Remark:
a-BPDA: 2,3,3',4'-Biphenyltetracarboxylic dianhydride
TPE-R: 1,3,-Bis(4-aminophenoxy)benzene
PA: Propargyl amine
NA: Nadic anhydride
PMDA: Pyromellitic dianhydride
o-TS: Orthotolidine sulfone

TABLE 2

| Composition of Imide Oligomers | Terminal-modified Imide Oligomer A | | Terminal modified Imide Oligomer B | | Results of Tests of Physical Properties | |
|---|---|---|---|---|---|---|
| | Kind | Amount (Weight Parts) | Kind | Amount (Weight Parts) | tg (°C.) | Heat-resistance* |
| Ex. 1 | A-Ia | 80 | B-IIIa | 20 | 295 | 80% |
| Ex. 2 | A-Ia | 66 | B-IIIa | 17 | 340 | 100% |
| | A-II | 17 | | | | |
| Ex. 3 | A-Ia | 80 | B-IVa | 20 | 300 | 80% |
| Ex. 4 | A-Ib | 80 | B-IIIb | 20 | 290 | 80% |
| Comp. 1 | A-Ia | 100 | — | — | 250 | 25% |
| Comp. 2 | — | — | B-IIIa | 100 | Unmeasurable** | |
| Comp. 3 | A-Ia | 90 | — | — | 260 | 29% |
| | A-II | 10 | | | | |

Remark:
*Remaining ratio (%) of shear modulus at high temperatures
**Unmeasurable because the heat-cured product is extremely fragile

EFFECT OF THE INVENTION

The terminal-modified imide oligomer composition of the present invention is heat-cured in a short time. The obtained heat-cured product is excellent in heat-resistance, mechanical strength and elasticity. Therefore, the composition of the invention can be used as a heat-resistant adhesive for various materials, a matrix resin for composites containing various reinforcements or fillers, or a molding resin. Particularly, the composition is advantageously used in the aircraft or space industry.

We claim:

1. A composition of terminal-modified imide oligomers which comprises a flexible terminal-modified imide oligomer and a rigid terminal-modified imide oligomer,
    wherein the flexible terminal-modified imide oligomer is formed from biphenyltetracarboxylic acid or its derivative, an aromatic diamine compound having two or more aromatic rings which are combined with each other directly or by a divalent group consisting of one, two or three atoms and an unsaturated monoamine compound or an unsaturated carboxylic acid or its derivative, and
    wherein the rigid terminal-modified imide oligomer is formed from biphenyltetra-carboxylic acid or its derivative, an aromatic diamine compound having only one aromatic ring or condensed ring and an unsaturated monoamine compound or an unsaturated carboxylic acid or its derivative.

2. The composition of terminal-modified imide oligomers as claimed in claim 1, wherein the flexible terminal-modified imide oligomer has the formula (Ia):

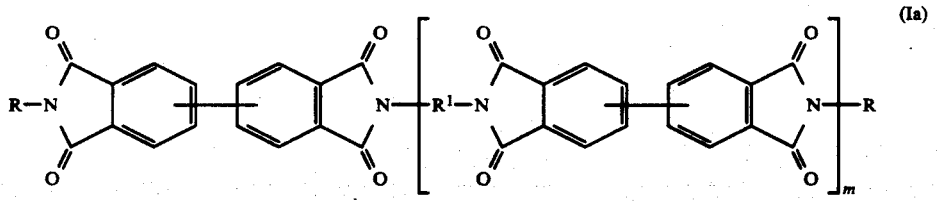

wherein R is a monovalent unsaturated terminal group derived from an unsaturated monoamine compound; $R^1$ is a divalent aromatic residue derived from an aromatic diamine compound having two or more aromatic rings which are combined with each other directly or by a divalent group consisting of one, two or three atoms; and m is an integer of to 80.

3. The composition of terminal-modified imide oligomers as claimed in claim 1, wherein the flexible terminal-modified imide oligomer has the formula (Ib):

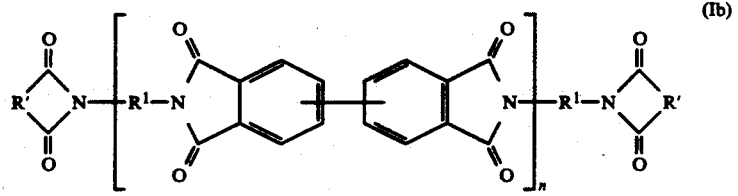

wherein R' is a divalent unsaturated terminal group derived from an unsaturated dicarboxylic acid or its derivative; $R^1$ is a divalent aromatic residue derived from an aromatic diamine compound having two or more aromatic rings which are combined with each other directly or by a divalent group consisting of one, two or three atoms; and n is an integer of 1 to 80.

4. The composition of terminal-modified imide oligomers as claimed in claim 1, wherein the rigid terminal-modified imide oligomer has the formula (IIIa):

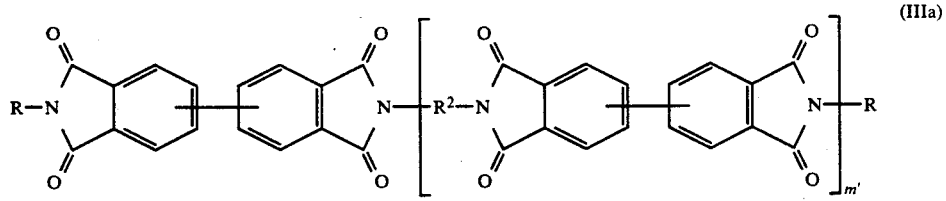
(IIIa)

wherein R is a monovalent unsaturated terminal group derived from an unsaturated monoamine compound; $R^2$ is a divalent aromatic residue derived from an aromatic diamine compound having only one aromatic ring or condensed ring; and m' is an integer of 1 to 80.

5. The composition of terminal-modified imide oligomers as claimed in claim 1, wherein the rigid terminal-modified imide oligomer has the formula (IIIb):

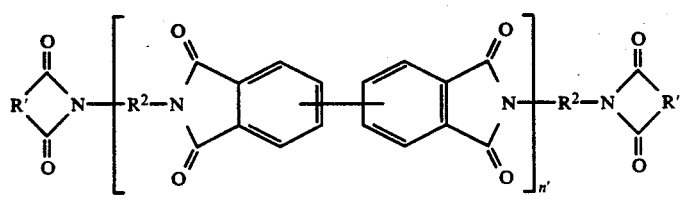
(IIIb)

wherein R' is a divalent unsaturated terminal group derived from an unsaturated dicarboxylic acid or its derivative; $R^2$ is a divalent aromatic residue derived from an aromatic diamine compound having only one aromatic ring or condensed ring; and n' is an integer of 1 to 80.

6. The composition of terminal-modified imide oligomers as claimed in claim 1, wherein each of the terminal-modified imide oligomers has a logarithmic viscosity in the range of 0.01 to 1 which is measured at concentration of 0.5 g/100 ml using N-methyl-2-pyrrolidone as solvent at temperature of 30° C.

7. The composition of terminal-modified imide oligomers as claimed in claim 1, wherein each of the terminal-modified imide oligomers has a melting point in the range of 100° to 300° C.

8. The composition of terminal-modified imide oligomers as claimed in claim 1, wherein each of the terminal-modified imide oligomers is soluble in an organic solvent.

9. The composition of terminal-modified imide oligomers as claimed in claim 1, wherein the rigid terminal-modified imide oligomer is contained in the composition in an amount of 2 to 70 weight % based on the total amount of the flexible and rigid terminal-modified imide oligomers.

* * * * *